United States Patent Office 3,410,649
Patented Nov. 12, 1968

3,410,649
CATIONIC RESINS WHICH ARE THE REACTION PRODUCT OF FORMALDEHYDE AND THE REACTION PRODUCT OF AMINO BASES WITH A METHYLOLATED AMINE SALT
Lucien Sellet, Saddle River, N.J., assignor to Diamond Shamrock Corporation, a corporation of Delaware
No Drawing. Continuation-in-part of application Ser. No. 281,050, May 16, 1963. This application Mar. 1, 1967, Ser. No. 619,573
16 Claims. (Cl. 8—94.33)

ABSTRACT OF THE DISCLOSURE

Stable cationic resins which are condensation products of (a) formaldehyde with (b) reaction products of (1) amino bases and (2) methylolated amine salts have been prepared and used in retanning leather and in coagulating polymeric materials. These resins can be dried from aqueous solutions without materially affecting their water solubility and molecular structure. A typical resin is the condensation product of formaldehyde with the reaction product of dicyandiamide and methylolated ammonium sulfate.

Cross-reference to related applications

This application is a continuation-in-part of my copending application Ser. No. 281,050, Sellet, filed May 16, 1963 and now abandoned.

The present invention relates to cationic resins, processes for producing them and use thereof in retanning leather and in coagulating polymeric materials. More particularly, the present invention relates to cationic, water stable resins, said resins being the condensation products of amino bases reacted with methylol amine salts and formaldehyde.

In general, cationic resins produced by condensing an amino base such as dicyandiamide with formaldehyde have suffered from the disadvantage that they are not stable in water and are easily polymerized to their water insoluble state. Therefore one of the great drawbacks in the commercial application of these cationic resins is their limited stability in water, especially under slightly acidic condtions which encourage condensation and polymerization of these resins when they are in an aqueous medium. For example, in the rubber latex industry, the lack of stability and subsequent change in physical and chemical properties of these resins, especially due to the presence of acidic surface active agents or dispersants in the water medium, seriously detract from the use of these cationic resins as coagulating agents for latex. In many cases, these resins produce undesirable side effects which are difficult to control and often cannot be controlled at all.

Another disadvantage of these resin condensates is that they are also easily polymerized to their water insoluble stage by the application of heat. Hence it has been almost impossible to easily dry water solutions containing these materials by such conventional means of applying heat as through spray drying or by oven or drum drying without materially affecting the water solubility and the structure of these condensed products. This has been extremely disadvantageous due to the fact that these resin condensates are prepared in water solutions.

Therefore an object of this invention is to produce water soluble cationic resin condensates which have increased cationic properties as compared to amino base-formaldehyde condensates and which are also stable in aqueous media even under acidic conditions.

A further object of this invention is to produce a water soluble cationic resin condensate which can be easily dried from an aqueous solution thereof, at elevated temperatures without materially affecting its water soluble properties and/or its molecular structure.

A further object of this invention is to produce a modified resin complex having high cationic activity and which is stable in water.

Other objects of this invention will be obvious and will in part appear hereinafter.

It has been unexpectedly discovered that water stable, highly cationic, resinous aminoplast complexes can be produced by condensing formaldehyde with an amino base, such as dicyandiamide, ammeline, guanamines, guanidine and melamine, the amino base having been previously reacted with the reaction product of formaldehyde and a nitrogen containing compound selected from the group consisting of substituted and unsubstituted alkyl mono-amine salts of carboxylic acids and inorganic mineral acids, said amine having at least one reactive hydrogen atom attached to the nitrogen atom of said amine, and ammonium salts of inorganic mineral acids and carboxylic acids. I have found that these complexes are soluble in water and do not polymerize or condense even under acidic conditions or through the application of heat. Furthermore, the very strong cationic properties of these aminoplast complexes makes them particularly valuable in precipitating or in activating anionic polymers and in breaking resin and rubber emulsions especially when anionic dispersants or emulsifiers are present.

The aminoplast complexes of this invention are prepared according to this invention by first reacting approximately one mole of a nitrogen containing salt selected from the group consisting of ammonium salts of inorganic mineral acids and carboxylic acids and an alkyl monoamine salts of inorganic mineral acids and carboxylic acids containing at least one reactive hydrogen attached to the nitrogen atom of the amine group, with a sufficient amount of formaldehyde to react with one of the active hydrogens on all of the nitrogen atoms contained within said salt. In this manner, the methylol amine salt is initially formed. This methylol amine salt is then next reacted with an amino base such as dicyandiamide, guanidine, guanamines, ammeline and melamine, the amino base being present in an amount sufficient to react with the total amount of the reactive methylol groups contained within the amine salt. Finally this reaction product is reacted with at least one mole of formaldehyde per mole of this reaction product to form the aminoplast resin complex.

The first stage of the preparation of the complex of this invention is carried out by reacting a salt of a nitrogen containing compound selected from the group consisting of an alkyl monoamine salts having at least one active hydrogen attached to the nitrogen atom and an ammonium salt with formaldehyde. This reaction is preferably carried out in the presence of water. The alkyl monoamine salt which may be utilized in accordance with this invention includes any inorganic mineral acid salt or any monocarboxylic acid salt of primary or secondary monoamines. Examples of suitable primary or secondary monoamines which can be used in accordance with this invention include lauryl amine, ethyl amine, diethyl amine, methyl amine, propylamine, ethanol amine, 3-amino propanol, isopropanol amine, dioctyl amine, stearyl amine, dicapryl amine, methyl lauryl amine, methyl soya amine, etc. These amines may be treated with an organic acid or an inorganic mineral acid to prepare the salts thereof. Suitable acids include hydrochloric acid, sulfuric acid, phosphoric acid, boric acid, formic acid, acetic acid, propionic acid, butyric acid, etc. Ammonium salts can be used in lieu of the amine salts in preparing the aminoplast complex of this invention. These ammonium salts include ammonium chloride, ammonium formate, ammonium acetate, ammonium borate, ammonium sulfate, ammonium nitrate, ammonium phosphate, etc.

The molar proportion of formaldehyde which is reacted with the salt of the nitrogen containing compound to form the methylolated amine salt will obviously vary depending upon the number of primary or secondary amine groups or ammonium groups contained within a mole of the salt of the nitrogen containing compound. The proportions should be such that all of the reactive ammonium groups or primary or secondary amine groups within the salt are reacted with formaldehyde. Preferably, in forming the methylolated amine salt, it is desirable to provide a reaction mixture with the ratio of about one mole of formaldehyde for every ammonium or reactive amine group contained within the salt. This reaction is preferably carried out at temperatures within the range of 50° to about 80° C. Higher or lower temperatures may be used but when using temperatures of above 80° C., care should be taken so as to avoid undesirable side reactions. Also, the time of the reaction will vary in different cases, depending upon the temperature, the time being usually in the range of about 0.25 hour to 2.5 hours.

The second stage of the preparation of the complex of this invention is to react, preferably in the presence of water, the methylolated amine salt with an amino base such as dicyandiamide, guanidine, ammeline, guanamine and melamine to produce an amino base complexed salt. By this reaction, amine salt groups are introduced into the amino base by means of the methylol groups reacting with the functional amino groups on the amino base, thereby eliminating water. In carrying out this reaction, molar proportions of about one or more, preferably from 1 to 10, moles of the methylolated amine salt per mole of the amine base should be utilized to form the amino base salt depending on the amount of functional amino groups contained within the amino base. This reaction is preferably carried out at temperatures of from about 50° to about 100° C. Also the time of the reaction will vary in different cases, the time being usually in the range of from about 0.25 hour to about 10 hours. As is well known, the time may be decreased by increasing the temperature and vice versa.

The third and final stage of the preparation of the complex of this invention is the condensation of the amino base complexed salt with at least one mole of formaldehyde preferably from about 1 to 10 moles, to produce the water soluble cationic resinous complex of this invention. This condensation reaction is preferably carried out in the presence of water.

In producing the aminoplast resin complex salt of this invention, any mole ratio greater than one mole of formaldehyde per mole of the amino base complexed salt may be utilized. The amount of formaldehyde can be varied depending upon the properties of the final resin complex salt desired and the nature of the amino base used. This is true since it has been found that by increasing the amount of formaldehyde, the hydrophilic properties of the resin is increased with a corresponding decrease in the cationic activity. This reaction may be carried out at temperatures of from about 90° to 110° C. or higher for a period of from about 1 to about 10 hours. The time may be decreased, as is well known, by increasing the temperature and vice versa. Higher heating temperatures and times may be used in some cases.

The aminoplast resin complex produced according to the method of this invention is a clear, light viscous aqueous solution. The solid product of this invention can be easily recovered from the aqueous solution by any conventional drying means such as spray drying, oven drying or drum drying. The final dried product is a white powder which can be easily dissolved in water at room temperature.

By the term "formaldehyde" as used in the specification and claims, I mean any compound capable of liberating formaldehyde such as paraformaldehyde, trioxane, etc. While formalin, which is an approximately 37% by weight aqueous solution of formaldehyde is preferably employed, formaldehyde or any compound liberating formaldehyde, as, for example, paraformaldehyde, trioxane, etc., may be used.

The strong cationic properties as well as the water stability of the resin salt complexes of this invention makes them particularly valuable in precipitating or inactivating anionic surfactants or dispersants. This property makes these compounds particularly valuable as coagulants in breaking resin and rubber dispersions or emulsions. Hence, an outstanding use of these aminoplast resin complexes is as coagulants in the production of latex rubber. In the preparation of latex rubber, the latex produced by the emulsion is dispersed or emulsified in water due to the anionic surfactants which are utilized in its preparation. Generally after the latex is produced by emulsion polymerization, the removal of the latex from its water dispersion or emulsion is accomplished with great difficulty. By utilizing the cationic resin complexes of this invention, one can easily recover the latex from its water emulsion or dispersion since these resin complexes break the emulsion by precipitating out the anionic surfactants which hold the latex in an emulsion or dispersion. Therefore by utilizing the complexes of this invention, the latex rubber is easily recovered from a water dispersion or emulsion.

The strong cationic properties of the resin complexes of this invention make them useful as beater additives when used in conjunction with resins or polymeric materials, dispersed in water by means of anionic dispersants in the process of treating cellulosic pulp with resins or polymeric materials. Due to the cationic properties of the complexes of this invention, the resins or polymeric materials are uniformly deposited on the cellulosic pulp. In this manner an improved paper is produced having a smooth finish and a uniform appearance.

Advantageously, the aminoplast resin complexes produced in connection with this invention are water soluble and maintain their stability in water even under acidic conditions. They have very good penetrating properties which make them very useful as fillers in treating materials which are penetrable or porous in nature such as leather, paper, fabrics, etc. A water solution of said resin complex is applied to said porous or penetrable material whereby said resin adheres to said material and fills the pores, thus producing a smooth finish to said material.

One of the outstanding uses of my novel cationic active resin complex is its use as an auxiliary tanning agent in combination with an anionic active water soluble or water dispersible tanning agent in the process of retanning leather. The cationic resin complex inter-reacts with the anionic active water soluble or water dispersible tanning agent in the process of retanning leather. In this process cationic resin complex inter-reacts with the anionic tanning component from the water so as to enhance fullness, tight grain, soft feel, bleaching and overall conditioning of the treated leather.

The aminoplast complexes of this invention are particularly useful auxiliary tanning agents in the retanning of chrome tanned leather, especially when the complexes are used in conjunction with a water soluble or water dispersible anionic, organic compound containing one or more sulfo groups, the sulfo compound being in the form of a neutral salt or free base. These compounds are well known anionic tanning agents. The beneficial tanning operation is performed by the inter-reaction on the chrome tanned leather of the highly cationic resinous complexes of this invention with the anionic organic compound. This procedure can be carried out by first absorbing the cationic complex of this invention in the chrome tanned leather by immersing or otherwise treating the leather with a water solution containing the resin complex of this invention. After this cationic complex is adsorbed on the leather, a water solution or dispersion containing the anionic organic compound is applied to the leather. Alternatively, the retanning procedure can be accomplished, in accordance with this invention, by first applying the anionic organic compound to the leather and thereafter applying the cationic tanning agent to the leather. In this manner, a retanned leather is produced that has enhanced fullness, tight and smooth grain, excellent bleaching effects and an overall soft feel.

Any water soluble or water dispersible anionic organic compound containing one or more sulfo groups can be used in conjunction with the cationic aminoplast resin condensates of this invention in the tanning of leather. Typical anionic organic compounds which may be utilized in accordance with this invention include sulphonated aromatic compounds such as benzene, phenol, cresol, xylenol, naphthol, catechol, resorcinol, naphthalene and anthracene, condensed with from about 0.5 to 1.5 moles of formaldehyde, and sulfonated amino bases such as dicyandiamide, ammeline, guanadines, melamine, condensed with from about 0.5 to 2.0 moles of formaldehyde. Various other sulfonated anionic organic compounds which may be utilized in conjunction with the aminoplast cationic resins of this invention are disclosed in column 3, lines 47 to 75 and column 4, lines 1 to 30 of U.S. Patent No. 2,944,046, Sellet, July 5, 1960, which is hereby incorporated by reference. Other typical anionic organic compounds which may be utilized in conjunction with the cationic aminoplast resins of this invention include the condensation product of urea-formaldehyde and sulfonated phenols which are disclosed in my copending application S.N. 266,718, filed September 27, 1962. These include beta-sulfo-naphthol condensed with the reaction product of 1 mole of urea and 1 to 4 moles of formaldehyde, xylenol sulfonic acid condensed with the reaction product of 1 mole of urea and 1 to 4 moles of formaldehyde, ortho-cresol sulfonic acid condensed with 1 mole of urea and 1 to 4 moles of formaldehyde.

In utilizing the cationic aminoplast resin complex of this invention as an auxiliary tanning agent for chrome tanned leather, generally from about 5% to about 15% by weight of these products can be utilized, based on the weight of the wet shaved leather. Amounts of over 15% by weight of the aminoplast resin complex of this invention can be used, but generally using such high amounts does not provide any increased beneficial tanning properties. Hence, it is seldom necessary to utilize these products in amounts in excess of 15% by weight.

Another outstanding use of the compounds of this invention is a coagulant in systems utilizing anionic surfactants and detergents. In the wash or waste waters from such systems, a small amount of anionic surfactants remain in the waste or wash water from the process. This waste water has proven a problem since the anionic surfactants and detergents contained therein cannot be easily removed from the wash water. In many cases, anionic detergents poison the sewerage system into which they are deposited since these materials are not destroyed by bacterial action. The products of this invention act as coagulants for the elimination of these anionic surfactants and detergents from waste waters by precipitating these surfactants and detergents from the waste or wash water system.

Another important use of the aminoplast resin complexes of this invention is as dyeing assistants in the dyeing of wool, silk, nylon, cotton, viscose rayon, etc., whenever acid dyes are used. These complexes greatly increase the affinity and fixation of anionic acid dyes to such fibers. By use of the complexes of this invention, the dyes when applied to fibers and submitted to after treatment have improved wash fastness.

For a fuller understanding of the nature and objects of this invention, reference may be had to the following examples which are given merely as a further illustration of the invention and are not to be construed in a limiting sense.

Example I

This example is directed to preparing a stable cationic resinous complex within the scope of this invention.

62 lbs. of boric acid (one mole), 100 lbs. of water and 68 lbs. of an aqueous solution containing 25% by weight of ammonia (one mole) were mixed together in a glass-lined kettle equipped with a heating mantle and heated to a temperature of about 75° C. At this temperature, 81.5 lbs. of an aqueous solution containing 37% by weight of formaldehyde (one mole) were introduced into the kettle and heated. Heating was continued at this temperature for about 30 minutes so as to produce the methylol amine salt. After this period, 84 lbs. of dicyandiamide (one mole) were added to the reaction kettle and refluxing was carried out at a temperature of 80° C. for a period of one-half hour so as to react all the methlylol amine salt with the dicyandiamide. After this period 244.5 lbs. of an aqueous solution containing 37% by weight of formaldehyde (3 moles) were slowly introduced into the kettle. In about 15 minutes all of the formaldehyde was introduced into the kettle. After this addition, the reaction was continued under constant stirring, by refluxing, for four hours at a temperature of about 92° C. After this period, the reaction product was cooled to room temperature. The cooled reaction product was in the form of a clear resinous solution at room temperature. This reaction product was spray dried. The final dried product was a white powder which was easily soluble in water at 20° C.

Example II

This example is directed to preparing a stable cationic resinous complex within the scope of this invention.

124 lbs. of boric acid (two moles), 200 lbs. of water and 136 lbs. of an aqueous solution containing 25% by weight of ammonia (2 moles) were mixed together in a glass-lined kettle equipped with a heating mantle and heated to a temperature of about 75° C. At this temperature 326 lbs. of an aqueous solution containing 37% by weight of formaldehyde (4.0 moles) were introduced into the kettle and heating was continued at this temperature for one hour so as to produce the methylol amine salt. After this period, 168 lbs. of dicyandiamide (two moles) were added to the reaction kettle and was refluxed at a temperature of 93° C. for a period of one hour so as to react all the methylol amine salt with the dicyandiamide. After this period 652 lbs. of an aqueous solution containing 37% by weight of formaldehyde (8.0 moles) were slowly introduced into the kettle. In about 15 minutes all of the formaldehyde was introduced into the kettle. After this addition, the reaction was continued under constant stirring, by refluxing, for four and one-half hours at a temperature of from about 92°. After this period, the reaction product was cooled to room temperature. The cooled reaction product was in the form of a clear resinous solution at room temperature. This reaction product was spray dried. The final dried product was a white powder which was easily soluble in water at 20° C.

Example III

This example is directed to preparing a stable cationic resinous complex within the scope of this invention.

126 lbs. of ammonium formate (2 moles) and 300 lbs. of water were mixed together in a glass-lined kettle equipped with a heating mantle and heated to a temperature of about 70° C. At this temperature, 163 lbs. of an aqueous solution containing 37% by weight of formaldehyde (2 moles) were introduced into the kettle and heated at a temperature of about 75° C. for 30 minutes so that all of the formaldehyde reacted with the ammonium formate. After this period, 84 lbs. of dicyandiamide (one mole) were added to the reaction kettle and was refluxed at a temperature of 98° C. for a period of two and one-half hours. After this period, 163 lbs. of an aqueous solution containing 37% by weight of formaldehyde (2 moles) were slowly introduced into the kettle.

In about 15 minutes all of the formaldehyde was introduced into the kettle. After this addition, the reaction was continued under constant stirring, by refluxing, for four hours at a temperature of from about 90° to 94° C. After this period, the reaction product was cooled to room temperature. The cooled reaction product was in the form of a clear resinous solution at room temperature. This reaction product was spray dried. The spray dried product was a white powder which was easily soluble in water at 20° C.

Example IV

This example is directed to preparing a stable cationic resinous complex within the scope of this invention.

218 lbs. of an aqueous solution containing 70% by weight of hydroxy acetic acid (2 moles) and 136 lbs. of an aqueous solution containing 25% by weight of ammonia (2 moles) were mixed together in a glass-lined kettle equipped with a heating mantle and heated to a temperature of about 75° C. At this temperature, 163 lbs. of an aqueous solution containing 37% by weight of formaldehyde (2 moles) were introduced into the kettle and heated for 30 minutes at a temperature of about 70° C. to form the methylol amine salt. After this period, 168 lbs. of dicyandiamide (2 moles) were added to the reaction kettle and was refluxed at a temperature of 93° C. for a period of one-half hour to react all of the methylol amine salt with dicyandiamide. After this period, 163 lbs. of an aqueous solution containing 37% by weight of formaldehyde (2 moles) were slowly introduced into the kettle. In about 15 minutes all of the formaldehyde was introduced into the kettle. After this addition, the reaction was continued under constant stirring, by refluxing, for four hours at a temperature of from about 92° C. After this period, the reaction product was cooled to room temperature. The cooled reaction product was in the form of a clear resinous solution at room temperature. This reaction product was spray dried. The spray dried product was a white powder which was easily soluble in water at 20° C.

Example V

This example is directed to preparing a stable cationic resin complex within the scope of this invention.

132 lbs. of ammonium sulfate (one mole) and 300 lbs. of water were mixed together in a glass-lined kettle equipped with a heating mantle and a reflux condenser and heated to a temperature of about 70° C. At this temperature, 163 lbs. of an aqueous solution containing 37% by weight of formaldehyde (2 moles) were introduced into the kettle and heated at a temperature of about 75° C. for 20 minutes so that all of the formaldehyde reacted with the amonium sulfate. After this period, 84 lbs. of dicyandiamide (one mole) were added to the reaction kettle and was refluxed at a temperature of 85° C. for a period of about 15 minutes. After this period, the reaction was completed by heating the contents of the kettle to a temperature of 95° C. for an additional period of four hours. After this period, 163 lbs. of an aqueous solution containing 37% by weight of formaldehyde (2 moles) were slowly introduced into the kettle. In about 15 minutes, all of the formaldehyde was introduced into the kettle. After this addition, the reaction was continued under constant stirring by refluxing for four hours at a temperature of from about 95° C. to 100° C. After this period, the reaction product was cooled to room temperature. The cooled reaction product was in the form of a clear resinous solution at room temperature. The pH of the solution containing the reaction product was about 2.0. This reaction product was spray dried. The spray dried product was a white powder which was easily soluble in water at 20° C.

Example VI

This example demonstrates the use of the composition of Example I as a coagulant for removing surface active agents from waste water.

10 ml. of an aqueous solution containing 0.03 gram of the product of Example I were slowly added to a flask containing 240 ml. of waste water, obtained from the production of latex. The waste water contained 0.4 gram per 1000 ml. of water of sodium lauryl sulfate dissolved therein. After all of the solution containing the product of Example I was added to the flask, a blue precipitate formed. This precipitate adhered to the wall of the flask. The flask was then vigorously shaken for about one minute. A few seconds after the shaking was stopped, part of the precipitate settled out of the water and part still adhered to the wall of the flask. In this manner the sodium lauryl sulfate was removed from the water as a precipitate.

Examples VII and VIII are directed to utilizing the complexes of this invention produced in Examples II and V as auxiliary agents in the retanning of leather.

Example VII 100 lbs. of shaved chrome pretanned hide leather which has been wrung, slit and shaved to weight were placed into a drum. The hides were neutralized in the drum to a pH of approximately 3.9 by adding sodium bicarbonate. The hides were subsequently washed at a temperature of 110° F. with water for approximately 15 minutes to remove shavings and salts. After washing was completed, approximately 25 lbs. of water heated to 50° C. containing, dissolved therein, approximately 10 lbs. of the solid dry cationic resinous complex of this invention produced in Example II, were added to the drum. The hides were treated with this solution for a period of about one hour so as to allow the hides to absorb the solution. Approximately 25 lbs. of water at 50° C. containing 3 lbs. of a solid phenolic condensate produced by condensing phenolic sulfonic acid with a urea-formaldehyde condensate as prepared in Example II of my copending application S.N. 226,718 filed September 27, 1962, were placed in the drum. The hides were treated with this solution for a period of one hour. After this period, the drum was drained and the hides were prepared for fat-liquoring. This was achieved by means of floating the stock in approximately 200 lbs. of water at a temperature of about 50° C. After 10 minutes, the water was drained from the drum. Fat-liquoring was carried out by floating the hides in 100 lbs. of water at 50° C. containing 6 lbs. of a multicharged fat-liquoring mixture composed of about 30% by weight of sulfated sperm oil, about 4% by weight of polyglycol oleate, about 4% by weight of the diethyl sulfate quaternary salt of oleic amide and about 50% by weight of neatsfoot oil. The remaining 12% of the fat-liquoring mixture contained the other conventional ancillary ingredients. After floating for one hour in the fat-liquoring bath, the drum was drained.

The leather produced by the above procedure was full and mellow having a tight grain. The leather has a pronounced white bleaching effect and had an overall soft feel and had a good resistance to discoloration upon exposure to light.

Example VIII 100 lbs. of shaved chrome pretanned hide leather which has been wrung, slit and shaved to weight were placed into a drum. The hides were neutralized in the drum to a pH of approximately 3.9 by adding sodium bicarbonate. The hides were subsequently washed at a temperature of 110° F. with water for approximately 15 minutes to remove shavings and salts. After washing was completed, approximately 25 lbs. of water heated to 50° C. containing, dissolved therein, approximately 10 lbs. of the solid cationic resinous complex of this invention produced in Example V, were added to the drum. The hides were treated with the solution for a period of about one hour so as to allow the hides to absorb the solution. After this period, approximately 25 lbs. of water at 50° C. containing 3 lbs. of a solid phenolic condensate produced by condensing phenolic sulfonic acid with a urea-formaldehyde condensate as prepared in Example V of my copending application S.N. 226,718, filed September 27, 1962, were placed in the drum. The hides were treated with this solution for a period of one hour. After this period, the drum was drained and the hides were prepared for fat-liquoring. This was achieved by means of floating the stock in approximately 200 lbs. of water at a temperature of about 50° C. After 10 minutes, the water was drained from the drum. Fat-liquoring was carried out by floating the hides in 100 lbs. of water at 50° C. containing 6 lbs. of a multicharged fat-liquoring mixture composed of about 30% by weight of sulfated sperm oil, about 4% by weight of polyglycol oleate, about 4% by weight of the diethyl sulfate quaternary salt of oleic amide and about 50% by weight of neatsfoot oil. The remaining 12% of the fat-liquoring mixture contained the other conventional ancillary ingredients. After floating for one hour in the fat-liquoring bath, the drum was drained.

The leather produced by the above procedure was full and mellow having a tight grain. The leather had a pronounced white bleaching effect and had an overall soft feel and had a good resistance to discoloration upon exposure to light.

Example IX

This example is directed to showing the use of the complexes of this invention as coagulants for rubber emulsions and a comparison of the product of this invention with a well known latex coagulant.

250 grams of dry pulp were disintegrated in 12,500 grams of water by means of a Lightning agitator. The disintegrated pulp-water mixture was then agitated by means of a beater to a freeness of 600 Canadian Freeness. The freeness was determined by means of TAPPI Standard Freeness Test No. T-227. The pulp-water mixture was then thickened to a consistency of 5.5%, by weight of dry pulp, by means of drawing some of the water through a wire screen. From this pulp-water mixture having a consistency of 5.5% by weight of dry pulp, there were drawn off two aliquot samples each weighing 102 grams and each having a consistency of 5.5% by weight of dry pulp. To each of the samples there was added 13.4 grams of Hycar 1562 (an acrylonitrile latex).

In the first aliquot sample, aliquot portion (1) there were added 3 grams of the solid aminoplast cationic resin complex produced in Example I.

In the second aliquot sample, aliquot portion (2) there were added 5 grams of aqueous solution containing 10% alum (a known latex coagulant).

From a comparison of the two samples it was noticed that the latex onto the pulp more completely deposited on the pulp in aliquot portion (1), where the complex of this invention was used as a coagulant as compared to aliquot portion (2) where a standard coagulant such as alum was used. It was also noted that the water in aliquot portion (1) where the complex of this invention was used was clear whereas in aliquot portion (2) where alum was used the wash water was white and scummy. This indicated that not all of the rubber latex had precipitated in aliquot portion (2) by the addition of alum whereas the addition of the complex of this invention all of the rubber latex had precipitated from the water leaving clear water.

What is claimed is:

1. A cationic resin characterized by being easily dried from solutions thereof at elevated temperatures without materially affecting water solubility and molecular structure thereof which is the condensation product of
   (A) at least one mole of formaldehyde with
   (B) one mole of a complex salt product which is the reaction product of
      (1) an amino base selected from the group consisting of dicyandiamide, ammeline, guanamines, guanidine, and melamine, with
      (2) a methylolated amine salt, which is the reaction product of formaldehyde with a nitrogen-containing salt selected from the group consisting of ammonium salts of carboxylic acids, ammonium salts of inorganic mineral acids, alkyl monoamine salts of carboxylic acids containing at least one reactive hydrogen attached to the nitrogen and alkyl monoamine salts of inorganic mineral acids containing at least one reactive hydrogen attached to the nitrogen, said formaldehyde being present in an amount sufficient to react with one of the active hydrogens on all of said nitrogen atoms contained within said salt.

2. The resin of claim 1 wherein said amino base is dicyandiamide.

3. The resin of claim 1 which is the condensation product of one mole of the complex salt product and from about 1 to about 10 moles of formaldehyde.

4. The resin of claim 1 wherein said nitrogen containing salt is the ammonium salt of an inorganic mineral acid.

5. The resin of claim 1 wherein said nitrogen containing salt is the ammonium salt of a carboxylic acid.

6. A process of producing a cationic resin characterized by being easily dried from solutions thereof at elevated temperatures without materially affecting water solubility and molecular structure thereof comprising in seriatim the steps of
   (A) reacting a nitrogen containing salt selected from the group consisting of the ammonium salts of carboxylic acids, ammonium salts of inorganic mineral acids, alkyl monoamine salts of carboxylic acids containing at least one reactive hydrogen attached to the nitrogen and alkyl monoamine salts of inorganic mineral acids containing at least one reactive hydrogen attached to the nitrogen with formaldehyde, said formaldehyde being present in an amount sufficient to react with one of the reactive hydrogens on all of said nitrogen atoms contained within said salt, so as to form a methylolated amine salt,
   (B) reacting said methylolated amine salt with an amino base selected from the group consisting of dicyandiamide, ammeline, guanamines, guanidine, and melamine, so as to form a complex salt product,
   (C) reacting one mole of said complex salt product with at least one mole of formaldehyde.

7. The process of claim 6 wherein said amino base is dicyandiamide.

8. The process of claim 7 wherein said complex salt product is reacted with from 1 to 10 moles of formaldehyde.

9. The process of claim 8 wherein said nitrogen containing salt is the ammonium salt of an inorganic mineral acid.

10. The process of claim 8 wherein said nitrogen containing salt is the ammonium salt of a carboxylic acid.

11. A process of producing a cationic resin characterized by being easily dried from solutions thereof at elevated temperatures without materially affecting water solubility and molecular structure thereof comprising in seriatim the steps of
   (A) reacting a nitrogen containing salt selected from the group consisting of the ammonium salts of carboxylic acid, ammonium salts of inorganic mineral acids, alkyl monoamine salts of carboxylic acids containing at least one active hydrogen attached to the nitrogen and alkyl monoamine salts of inorganic mineral acids containing at least one reactive hydrogen attached to the nitrogen with formaldehyde, said formaldehyde being present in an amount sufficient to react with one of the active hydrogens on all of said nitrogen atoms contained within said salt, so as to form a methylolated amine salt,
   (B) reacting said methylolated amine salt at temperatures of from about 50° to 100° C. with an amino base consisting of the group consisting of dicyandiamide, ammeline, guanamines, guanidine, and melamine so as to form an amino base complex salt, said methylolated amine salt being present in an amount of from 1 to 10 moles per mole of said amino base, (C) reacting one mole of said amino base complex salt with from about 1 to 10 moles of formaldehyde at a temperature or from about 90° C. to 110° C. to form said resin complex.

12. The process of claim 11 wherein said amino base is dicyandiamide.

13. The process of claim 12 wherein said nitrogen containing salt is the ammonium salt of an inorganic mineral acid.

14. A process for retanning leather which comprises applying to chrome tanned leather (a) an anionic organic compound containing at least one sulfo group and (b) the cationic resin of claim 1.

15. A process for retanning leather which comprises applying to chrome tanned leather (a) an anionic organic compound containing at least one sulfo group and (b) the cationic resin produced by the process of claim 6.

16. A process for retanning leather which comprises applying to chrome tanned leather (a) an anionic organic compound containing at least one sulfo group and (b) the cationic resin produced by the process of claim 11.

References Cited

UNITED STATES PATENTS

| | | |
|---|---|---|
| 2,267,290 | 12/1941 | Somerville et al. |
| 2,440,988 | 5/1948 | Treboux et al. |
| 2,550,638 | 4/1951 | Dawson. |
| 2,741,535 | 4/1956 | Streck. |
| 2,774,749 | 12/1956 | Stanley et al. |
| 2,847,396 | 8/1958 | Sellet. |
| 2,864,781 | 12/1958 | Albrecht et al. |
| 2,950,268 | 8/1960 | Cofrancesco et al. |
| 3,206,435 | 9/1965 | Heyden et al. |

WILLIAM H. SHORT, *Primary Examiner.*

H. SCHAIN, *Assistant Examiner.*